United States Patent [19]

Takeda et al.

[11] Patent Number: 4,685,607
[45] Date of Patent: Aug. 11, 1987

[54] NITRIDE CERAMIC-METAL COMPLEX MATERIAL AND METHOD OF PRODUCING THE SAME

[75] Inventors: Hiromitsu Takeda, Tokyo; Masako Nakahashi, Kawasaki; Makoto Shirokane, Tokyo; Akihiko Tsuge, Yokohama; Takao Suzuki, Ichikawa, all of Japan

[73] Assignee: Kabushiki Kaisha Toshiba, Kawasaki, Japan

[21] Appl. No.: 735,106

[22] Filed: May 17, 1985

[30] Foreign Application Priority Data

May 21, 1984 [JP]  Japan ................................. 59-102021
Jul. 24, 1984 [JP]  Japan ................................. 59-152003
Feb. 6, 1985 [JP]  Japan ................................. 60-20072

[51] Int. Cl.$^4$ .............................................. B23K 20/14
[52] U.S. Cl. ..................................... 228/193; 228/124; 228/263.12; 419/13
[58] Field of Search ................... 228/124, 122, 263.12, 228/193, 206; 419/13, 29

[56] References Cited

U.S. PATENT DOCUMENTS

| | | | |
|---|---|---|---|
| 2,957,238 | 10/1960 | Harvey et al. | 228/124 R |
| 3,628,233 | 12/1971 | Sowko | 228/124 R |
| 4,324,356 | 4/1982 | Blair et al. | 419/13 X |
| 4,456,577 | 6/1984 | Kawakita | 419/13 X |
| 4,492,737 | 1/1985 | Conolly | 419/13 X |

FOREIGN PATENT DOCUMENTS

| | | | |
|---|---|---|---|
| 1596904 | 7/1970 | France | 419/29 |
| 59-107984 | 6/1984 | Japan . | |
| 223280 | 12/1984 | Japan | 228/263.12 |
| 137876 | 7/1985 | Japan | 228/263.12 |

*Primary Examiner*—Kenneth J. Ramsey
*Attorney, Agent, or Firm*—Oblon, Fisher, Spivak, McClelland & Maier

[57] ABSTRACT

A method of forming a nitride ceramic-metal complex material without using a special bonding material. This method comprises bringing a metallic material into contact with the surface of a nitride ceramic material, heating under vacuum the nitride ceramic material so as to dissociate the surface of the nitride ceramic material into nitrogen and a precursor of the ceramic material, thereby allowing the dissociated precursor to react with the metallic material and to achieve bonding between the nitride ceramic material and the metallic material. A nitride ceramic-metal complex material produced by the above method is also proposed.

15 Claims, No Drawings

NITRIDE CERAMIC-METAL COMPLEX MATERIAL AND METHOD OF PRODUCING THE SAME

BACKGROUND OF THE INVENTION (a) Field of the Invention

The present invention relates to a complex material prepared by bonding a nitride ceramic material to a metal material, and to a method of producing the complex material.

(b) Description of the Prior Art

The ceramic material, which exhibits various excellent properties, is widely used nowaday as construction materials, functional materials, etc. In many cases, the ceramic material is singly used as, for example, a construction material. However, to further widen the field of use of the ceramics, it is required that the ceramic material be capable of bonding to a metal material so as to form a complex material. Where the complex material is used as a construction material, a sufficiently high bonding strength is required in the joined portion. Where the complex material is used as a functional material, a continuity or the like is required at the boundary between the ceramic material and the metal material. However, the ceramic material and the metal widely differ from each other in the chemical properties such as the reactivity as well as in the physical properties such as the thermal expansion coefficient, making it difficult to achieve a metallurgical bonding of a high reliability between the ceramic and metal materials.

As a method of bonding ceramic and metal materials to obtain the complex material described above, U.S. Pat. No. 2,857,663 discloses a method which utilizes an active metal. This prior art utilizes the phenomenon that, if an active metal of, for exaple, Ti or Zr is alloyed with a transition metal such as Cu or Ni, the melting point of the resultant alloy is lowered by hundreds of degrees centrigrade. On the basis of this phenomenon, a metal material is bonded to an oxide ceramic material such as alumina, forsterite, beryllia or zirconia. In this case, however, the upper limit of the temperature under which the resultant complex material can be used is restricted by the melting point of the bonding material which is lower than the melting point of the metal material.

A method of forming a metal layer on the surface of ceramic materials (or metallizing method) is also known to the art as a method of composing a ceramic material to a metal material. This method makes it possible to impart the physical and chemical functions of the metal to the surface of the ceramic material. This method is also effective when used as a pretreatment in the operation of mechanically bonding a ceramic material to a metal material.

However, in the known metallizing method applied to a nitride ceramic material, the nitride ceramic material itself is low in its wettability with metal, with the result that the metallizing fails to proceed smoothly. It follows that, in spite of the complex metallizing process, the adhesive force of the resultant metal layer to the surface of the nitride ceramic material is very small. Particularly, in the case of a pure nitride ceramic material which does not contain a sintering assistant or the like, the adhesive force in question is negligibly small.

SUMMARY OF THE INVENTION

An object of the present invention is to provide a nitride ceramic-metal complex material having a high bonding strength between the ceramic material and the metal material, and a method of producing the same. In the present invention, a strong bonding is achieved between the nitride ceramic material and the metal material without using a special bonding material. In addition, the high temperature characteristics of the ceramic material and the particular physical, electrical and chemical characteristics of the metal material can be fully utilized in the complex material of the present invention.

According to the present invention, there is provided a method of producing a nitride ceramic-metal complex material on the basis of a chemical reaction, comprising the steps of:

bringing a metallic material selected from the group consisting of a metal rich in reactivity with a precursor to nitride (or a metal or alloy to be nitrogenized, i.e. a component or components of the nitride ceramic other than nitrogen) and an alloy of said metal into contact with the surface of a nitride ceramic material; and heating under vacuum, the nitride ceramic material which is kept in contact with the metallic material so as to dissociate the surface of the nitride ceramic material into nitrogen and a precursor to nitride, thereby allowing the dissociated precursor to nitride to react with the metal or alloy thereof so as to achieve bonding between the nitride ceramic material and the metallic material.

Also provided is a nitride ceramic-metal complex material, in which the junction between the nitride ceramic material and the metal material is formed of the reaction product between the metal material and a precursor to nitride dissociated by heating the nitride ceramic material under vacuum, and the exposed surface of the metal material exhibits the chemical, electrical and physical properties inherent in the metal material.

DETAILED DESCRIPTION OF THE PREFERRED EMBODIMENT

As a result of extensive research, the present inventors have found that a nitride ceramic material is slightly dissociated into its constituent elements, when heated under vacuum. It has been also found that a nitride ceramic material can be strongly bonded to a metal material, if the dissociated elements are utilized for the bonding. Based on these findings, the present inventors have established a method of producing a nitride ceramic-metal complex material which fully exhibits the high temperature characteristics of the nitride ceramic material.

Specifically, a nitride ceramic material, e.g., $Si_3N_4$, is dissociated as follows, when heated under a reduced pressure, particularly, under a pressure lower than the nitrogen partial pressure of the air:

$$Si_3N_4 \rightarrow 3Si + 2N_2$$

The resultant Si is in the form of a solid, liquid or gas depending on the temperature. The solid Si does not move away from the $Si_3N_4$ material surface and is highly reactive with the metal material. Thus, the solid Si reacts with the metal material so as to achieve a strong bonding between the $Si_3N_4$ material and the metal material. To be more specific, the silicon dissociated from the silicon nitride ceramic material performs a chemical reaction with the metal at the interface between the ceramic material and the metal material so as to form a mixture of crystals of the metal and the silicide. What should be noted is that the reaction product, i.e., the mixture of crystals, is melted so as to make the ceramic material surface fully wet, with the result that a metallized layer formed of the reaction product is strongly adhered to the ceramic material surface.

The nitride ceramic materials used in the present invention include, for example, silicon nitride, aluminum nitride and SiAlON. A nitride ceramic material of a high purity can be used singly in the present invention. Also, the nitride ceramic material may contain a sintering assistant or the like.

The metals or alloys thereof rich in reactivity with a precursor to nitride such as silicon consist of transition metals. The transition metal used in the present invention should have a melting point higher than that of at least one of the reaction products with the nitride source. The transition metal or alloy thereof is not melted in the heating step. However, the reaction product with the precursor to nitride dissociated on the surface is melted so as to make the nitride ceramic material surface wet, with the result that the transition metal or alloy thereof is strongly bonded to the wet surface of the nitride ceramic material. It follows that the resultant metallized layer exhibits satisfactory physical, electrical and chemical characteristics.

Where the metal or alloy thereof has a melting point lower than that of the reaction product mentioned above, the metal or alloy thereof is melted before melting of the reaction product. Naturally, the surface of the nitride ceramic material is covered first with the molten metal or alloy so as to prevent dissociation of the ceramic material surface region. Thus, the alloying between the dissociated precursor to nitride and the metal does not proceed, resulting in failure to provide wetting on the ceramic material surface.

The metals used in the present invention include, for example, Fe, Co, Ni, Pt and alloys thereof, e.g., an alloy containing at least 50% by weight of at least one of Fe, Co, Ni and Pt. Specifically, it is desirable to use, for example, a silicon steel, carbon steel, alloy steel, special steel, Ni-Cr alloy, Ni-Al alloy or Ni-Ti alloy. The metal or alloy may be used in the form of powder, foil or wire. Also, metallic materials of different forms may be used in combination.

Where the metal or alloy is powdery, the particle diameter of the powder should desirably be not more than 100 $\mu$m. In the case of using wires of the metal or alloy, the diameter of the wire should desirably be 50 $\mu$m or less. Further, where the metal or alloy is in the form of a foil, the thickness of the foil should desirably be 30 $\mu$m or less.

In the present invention, it is also possible to use a metallic material in the form of a block, i.e., a structure or a functional body formed in advance for the specific purpose. In this case, it is desirable to form a buffer layer on the bonding surface of the metallic block, said buffer layer consisting of a ceramic material having a thermal expansion coefficient equal to or lower than that of the nitride ceramic material and a metal capable of reaction with the precursor to nitride. It is desirable to form the buffer layer such that the ceramic-to-metal ratio thereof is gradually lowered from the side of the nitride ceramic material toward the metal block side.

The buffer layer may be formed by, for example, a flame spraying method.

In forming the complex material, the metallic material is disposed on or brought into contact with the surface of the nitride ceramic material. Where the metallic material is powdery, it is advisable to coat the ceramic material surface with a paste prepared by adding a suitable solvent to the metallic powder. The ceramic material having the surface covered with the metallic material is put in a vacuum furnace. After the furnace has been sufficiently evacuated, the entire ceramic material covered with the metallic material is heated. Alternatively, the entire ceramic material may be heated while the furnace is being evacuated. The degree of vacuum employed in the heating step is either of a low level ranging between the atmospheric and $10^{-3}$ Torr or of a medium-high level which is lower than $10^{-3}$ Torr. Preferably, the degree of vacuum should range between $10^{-3}$ to $10^{-7}$ Torr.

The degree of vacuum is related to the heating temperature. In general, the heating temperature may be set at a low level, if the degree of vacuum within the furnace is set at a high level, i.e. at a low pressure. This is because the temperature at which the surface region of the nitride ceramic material is dissociated into the precursor to nitride and nitrogen, i.e., the dissociating temperature, depends not only on the heating temperature but also on the pressure within the vacuum furnace.

In order to permit the surface region of the nitride ceramic material to be dissociated into the precursor to nitride and nitrogen under the prescribed vacuum within the furnace, it is desirable to start the heat treatment at a temperature lower than the dissociating temperature mentioned above, followed by elevating the heating temperature at a prescribed rate to the highest temperature at which the entire ceramic material is heated. The highest temperature mentioned is maintained for a prescribed period of time.

The highest heating temperature is set to fall between the melting point of the reaction product mentioned previously and the melting point of the metallic material itself. If the highest heating temperature is lower than the melting point of the reaction product, the reaction product cannot be melted, quite naturally, resulting in failure to provide the ceramic material surface with wetting. If the highest heating temperature is still lower, a chemical reaction does not take place between the precursor to nitride and the metallic material. On the other hand, if the highest heating temperature is higher than the melting point of the metallic material, the metallic material itself is melted, making it difficult to dissociate the surface region of the nitride ceramic material as described previously.

Specific values of the melting point of the reaction product, the dissociating temperature of the ceramic material surface region and the highest heating temperature depend on the kind of the metallic material actually used and the degree of vacuum established within the vacuum furnace. However, the highest heating temperature should desirably be 1,200° C. or more in general.

In the metallized layer or bonding layer thus formed, the metallic material is chemically bonded to the surface of the nitride ceramic material. Naturally, the metallic material and the nitride ceramic material are strongly bonded to each other. It should be noted that the resultant bonding layer consists of an alloy layer in which the amount of the constituent elements of the ceramic material is gradually diminished toward the metallic material, with the result that the bonding layer sufficiently exhibits the physical, electrical and chemical characteristics close to those of the metallic material. It follows that the heat resistance of the complex material produced by the method of the present invention is substantially determined by the metallic material regardless of the melting point of the bonding layer, making it possible to sufficiently utilize the high temperature characteristics of the nitride ceramic material.

The complex material of the present invention can be used for forming various structural parts and functional parts. For example, a turbine rotor formed of a nitride ceramic material may be bonded to a metallic shaft so as to provide a supercharger having a high bonding strength and exhibiting excellent high temperature characteristics. In addition, the complex material of the present invention can be used for forming electric circuits, decorative articles, functional parts, etc.

EXAMPLE 1

The surface of a silicon nitride ceramic plate was coated to a thickness of 30 μm with a paste prepared by adding ethylalcohol acting as a solvent to a nickel powder of 325 meshes or less (Tyler standard sieve), followed by putting the coated plate in a vacuum furnace.

After the pressure within the furnace was set at $1 \times 10^{-6}$ Torr, the coated plate was heated at the rate of 900° C./hr to 1,250° C., which was maintained for 10 minutes.

The surface of the heated plate was examined after the cooling, finding that a continuous metallized layer was formed on the entire surface of the ceramic plate. The metallized layer was examined by means of an X-ray diffractometry, finding that the metallized layer consisted of a mixture of Ni($\alpha$) and Ni$_5$Si$_2$ crystals.

The metallized layer is thought to have been formed by the reactions given below:

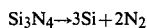

The reaction product, i.e., Ni($\alpha$)+Ni$_5$Si$_2$, has a melting point of 1,152° C., which is lower than the highest heating temperature of 1,250° C. Thus, the reaction product is thought to have been melted on the surface of the silicon nitride ceramic plate so as to wet the ceramic plate surface.

Also, the electric conductivity and chemical resistance of the metallized layer were found to be substantially equal to those of Ni.

Further, a bonding strength test was conducted by using an epoxy resin type adhesive in order to examine the bonding strength between the ceramic plate and the metallized layer, with the result that the epoxy resin layer was found broken. This indicates that the bonding strength between the ceramic plate and the metallized layer is higher than the bonding strength between the ceramic plate and the adhesive resin layer. In other words, the bonding strength between the ceramic plate and the metallized layer was found to be greater than 3 kg/mm$^2$.

EXAMPLE 2

The surface of a silicon nitride ceramic plate was coated to a thickness of 30 μm with a paste prepared by adding acetone acting as a solvent to a Co powder of 325 meshes or less (Tyler standard sieve), followed by putting the coated plate in a vacuum furnace.

After the pressure within the furnace was set at $1 \times 10^{-4}$ Torr, the coated plate was heated at the rate of 900° C./hr to 1,300° C., followed by immediately cooling the heated plate.

The surface of the heated plate was examined after the cooling, finding that a continuous metallized layer was formed on the entire surface of the ceramic plate. The metallized layer was examined by means of an X-ray diffractometry, finding that the metallized layer consisted of a mixture of Co and Co$_2$Si crystals.

The reaction product, i.e., Co+Co$_2$Si, has a melting point of 1,195° C., which is lower than the highest heating temperature of 1,300° C. Thus, the reaction product is thought to have been melted on the surface of the silicon nitride ceramic plate so as to wet the ceramic plate surface.

Also, the electric conductivity, chemical resistance and bonding strength to the ceramic plate of the metallized layer were found to be substantially equal to those in Example 1.

EXAMPLE 3

The surface of a silicon nitride ceramic plate was coated to a thickness of 30 μm with a paste prepared by adding ethylalcohol acting as a solvent to an iron powder of 325 meshes or less (Tyler standard sieve), followed by putting the coated plate in a vacuum furnace.

After the pressure within the furnace was set at $1 \times 10^{-6}$ Torr, the coated plate was heated at the rate of 900° C./hr to 1,250° C., which was maintained for 5 minutes.

The surface of the heated plate was examined after the cooling, finding that a continuous metallized layer was formed on the entire surface of the ceramic plate. The metallized layer was examined by means of an X-ray diffractometry, finding that the metallized layer consisted of a mixture of Fe and FeSi.

The metallized layer was also found to exhibit excellent characteristics of a metal layer and a high adhesion to the ceramic plate, though the corrosion resistance and the oxidation resistance of the metallized layer were found to be somewhat inferior to those in Examples 1 and 2.

EXAMPLE 4

The surface of a plate of SiAlON having a chemical formula Si$_4$Al$_2$O$_2$N$_6$ was coated to a thickness of about 30 μm with a paste prepared by adding ethylalcohol acting as a solvent to a Ni-20% Cr alloy powder of 325 meshes or less (Tyler standard sieve), followed by putting the coated plate in a vacuum furnace.

After the pressure within the furnace was set at $1 \times 10^{-6}$ Torr, the coated plate was heated at the rate of 900° C./hr to 1,250° C., which was maintained for 5 minutes.

The surface of the heated plate was examined after the cooling, finding that a continuous metallized layer was formed on the entire surface of the ceramic plate. The metallized layer was examined by means of an X-ray diffractometry, finding that the metallized layer consisted of a eutectic of Ni (+Cr)/Ni (+Cr)$_5$Si$_2$.

The bonding strength of the metallized layer was found be substantially equal to that in Example 1.

EXAMPLE 5

One end surface of a $Si_3N_4$ column having a diameter of 4 mm and one end surface of a SUS 304 stainless steel column having a diameter of 4 mm were abraded to an extent of about 6s. The abraded surfaces were joined to each other with a pressure of 3 kg/cm$^2$, and the joined column was put in a vacuum vessel included in a vacuum hot press apparatus. Then, the vacuum vessel was evacuated to a vacuum of about $3 \times 10^{-5}$ Torr, and the joined column was heated to 1,200° C., which was maintained for 3 minutes. A $Si_3N_4$-stainless steel complex material was obtained after the cooling.

The joined region of the complex material taken out of the hot press apparatus was found to consist of a fused layer about 0.1 mm thick. Also, the cross section of the joined region was analyzed with an energy dispersion type X-ray detector, finding that the joined region consisted of an Fe-Si alloy. Further, the bonding strength of the joined region, which was determined by applying a tensile tester to the complex material, was found to be 1,500 kg/cm$^2$ at room temperature and about 100 kg/cm$^2$ at 850° C.

EXAMPLE 6

The edge of the axle portion of a turbine rotor formed of $Si_3N_4$ was cut into a truncated cone shape. Also, a shaft formed of SCr 420 (Cr steel) and having a concavity in the end portion to conform with the edge of the axle portion of the turbine rotor was engaged with the edge of the axle portion. Under this condition, the rotor-shaft combination was put in a vacuum furnace.

Then, the vacuum furnace was evacuated to a vacuum of about $3 \times 10^{-5}$ Torr, followed by heating the rotorshaft combination to 1,200° C., which was maintained for 3 minutes. A supercharger was obtained by cooling the combination within the furnace.

A fused layer of Si and SCr 420, which was about 0.1 mm thick, was found to have been formed over the entire joined region between the rotor and the shaft of the produced supercharger. Also, a hot spin test was applied to the produced supercharger at 600° C. and under the rotating speed of 200,000 rpm. However, no abnormality was found in the supercharger.

EXAMPLE 7

A buffer layer consisting of a complex material of SUS 304 stainless steel and $Al_2O_3$-$SiO_2$ ceramic was formed by plasma-spraying on one end of a SUS 304 stainless steel column having a diameter of 10 mm. The components of the complex material were distributed such that the ceramic content of the complex material was gradually increased toward the surface of the buffer layer. Specifically, the ceramic content was gradually increased from 0 to 50% starting with the region in direct contact with the stainless steel column. Then, a $Si_3N_4$ rod having a diameter of 10 mm was joined to the buffer layer formed on the end of the stainless steel column with a joining pressure of 5 kg/cm$^2$, so as to prepare a complex material.

Under this condition, the complex material was put in a vacuum hot press apparatus. After the vacuum vessel was evacuated to a vacuum of about $3 \times 10^{-5}$ Torr, the complex material was heated to 1,200° C., which was maintained for 3 minutes.

After the cooling, a microscopic observation was applied to the joined region of the complex material, finding that chemical reactions had taken place between the stainless steel and $Si_3N_4$ contained in the buffer layer so as to achieve strong bonding between the stainless steel column and the $Si_3N_4$ rod. Further, the bonding strength between the stainless steel column and the $Si_3N_4$ rod, which was determined by applying a tensile tester to the complex material, was found to be 1,200 kg/cm$^2$ at room temperature and 75 kg/cm$^2$ at 900° C.

EXAMPLE 8

The surface of a silicon nitride ceramic plate (25 mm $\times$ 25 mm) was coated in a spot pattern having a thickness of 30 $\mu$m with a paste prepared by adding ethylalcohol acting as a solvent to a nickel powder of 325 meshes or less (Tyler standard sieve), followed by putting the coated plate in a vacuum furnace.

After the pressure within the furnace was set at $1 \times 10^{-6}$ Torr, the coated plate was heated at the rate of 900° C./hr to 1,250° C., which was maintained for 10 minutes.

The surface of the heated plate was examined after the cooling, finding that a metallized layer of a spot pattern was formed on the surface of the ceramic plate. The metallized layer was examined by means of an X-ray diffractometry, finding that the metallized layer consisted of a mixture of Ni($\alpha$) and $Ni_5Si_2$ crystals.

Then, a plate (25 mm $\times$ 25 mm) of Inconel 738, which is a Ni alloy, was put on the metallized layer, followed by putting the entire structure in a hot press apparatus. After heated to 1,200° C. under an argon atmosphere, a pressure of 200 kg/cm$^2$ was applied to the structure for 30 minutes.

After the cooling, the cross section at the junction between the silicon nitride ceramic material and the Inconel 738 alloy was examined by a scanning electron microscope equipped with an analyzer. A reaction layer was found at the boundary between the ceramic material plate and the metallized layer, supporting that a chemical bonding had been achieved between the two. Also, it was difficult to clearly recognize the interface between the Inconel 738 alloy plate and the metallized layer, suggesting that atoms of the alloy plate and the metallized layer had been mutually diffused sufficiently.

Since the metallized layer of a spot pattern was interposed between the ceramic material plate and the Inconel 738 alloy plate, these two plates were not bonded to each other over the entire region. Thus, structural defects such as cracks were not found in the bonded region so as to provide a satisfactory bonding in spite of a large thermal change given to the structure.

Further, the bonding strength between the silicon nitride ceramic material and the Inconel 738 alloy was found to be more than 150 kg/cm$^2$ at 850° C., which is practically sufficient.

EXAMPLE 9

The surface of a silicon nitride ceramic plate was coated to a thickness of 30 $\mu$m with a paste prepared by adding ethylalcohol acting as a solvent to a nickel powder of 325 meshes or less (Tyler standard sieve), followed by putting the coated plate in a vacuum furnace.

After the pressure within the furnace was set at $1 \times 10^{-6}$ Torr, the coated plate ws heated at the rate of 900° C./hr to 1,250° C., which was maintained for 10 minutes.

The surface of the heated plate was examined after the cooling, finding that a continuous metallized layer was formed on the entire surface of the ceramic plate. The metallized layer was examined by means of an X-ray diffractometry, finding that the metallized layer consisted of a mixture of Ni($\alpha$) and Ni$_5$Si$_2$ crystals.

Still further, the metallized layer of the ceramic plate was bonded to S45C carbon steel by the ordinary brazing method using a 72Ag-28Cu silver wax. The silver was was found to be attached satisfactorily to the metallized layer formed on the surface of the silicon nitride ceramic plate.

EXAMPLE 10

A couple of hollow hemispherical bodies (or cups) were molded from green silicon nitride, followed by sintering the cups by the ordinary method. The resultant sintered cups were found to be 20 mm in diameter and 3 mm in thickness.

The open edge of the cup was coated to a thickness of 20 μm with a paste prepared by adding ethylalcohol to a 80Ni-20Cr alloy powder of 325 meshes, followed by putting the two cups in a vacuum furnace. After the pressure within the furnace was set at $1 \times 10^{-6}$ Torr, the coated cups were heated at the rate of 900° C./hr to 1,250° C., which was maintained for 10 minutes.

The surface of each of the heated cups was examined after the cooling, finding that a continuous metallized layer was formed on the open edge portion of each of the cups.

The resultant two cups, which were held together such that the metallized surfaces thereof were in mutual contact, were subjected to a hot pressing for 30 minutes at a temperature of 1,250° C., a pressure of 10 kg/mm$^2$ and under an argon atmosphere. The metallized layers were found to have been bonded to each other by mutual diffusion so as to provide a hollow ball. The hollow ball weighed 8.9 g and, thus, the weight was decreased by about 34%, compared with a solid ball which weighed about 13.4 g. Also, the hollow ball was never inferior to the solid ball in its wear resistance. Further, the bonding strength at the joined portion of the hollow ball was found to be 100 kg/cm$^2$ at 700° C.

What is claimed is:

1. A method of producing a nitride ceramic-metal complex material, comprising the steps of:
   bringing a metallic material selected from the group consisting of a metal rich in reactivity with a precursor to nitride and an alloy of said metal into contact with the surface of a nitride ceramic material; and
   heating under vacuum the nitride ceramic material which is kept in contact with the metallic material so as to dissociate the surface of the nitride ceramic material into nitrogen and a precursor to nitride, thereby alloying the dissociated precursor to nitride to react with the metal or alloy thereof so as to achieve bonding between the nitride ceramic material and the metallic material.

2. The method according to claim 1, wherein the nitride ceramic material is a silicon nitride ceramic material.

3. The method according to claim 1, wherein the nitride ceramic material is SiAlON.

4. The method according to claim 1, wherein the metallic material has a melting point higher than that of at least one of the reaction products between the precursor to nitride and the metallic material.

5. The method according to claim 1, wherein the metallic material is powdery and has a particle diameter of not more than 100 μm.

6. The method according to claim 1, wherein the metallic material is in the form of wires having a diameter of 50 μm or less.

7. The method according to claim 1, wherein the metallic material is in the form of foils.

8. The method according to claim 1, wherein the metallic material is in the form of blocks.

9. The method according to claim 8, wherein a buffer layer consisting of a metal and a ceramic material is formed on the surface of the block of the metallic material.

10. The method according to claim 9, wherein the ceramic material concentration of the buffer layer is gradually increased from the region in direct contact with the metallic material toward the nitride ceramic material.

11. The method according to claim 10, wherein the bufer layer is formed by flame spraying of a mixture consisting of a metal and a ceramic material.

12. The method according to claim 1, wherein the heating is carried out under a vacuum of $10^{-3}$ Torr or less.

13. The method according to claim 1, wherein the heating temperature is lower than the melting point of the metallic material.

14. The method according to claim 1, wherein the highest heating temperature is 1,200° C. or more.

15. The method according to claim 1, wherein the heat treatment is carried out under a vacuum of $10^{-3}$ Torr or less and the highest temperature of 1,200° C. or more.

* * * * *